Feb. 1, 1966   C. E. BUTCHER ET AL   3,232,807
PROCESS FOR MAKING A WINDOW
Filed Oct. 11, 1962

INVENTORS
Clarence E. Butcher
James A. Conley
BY
Charles L. Lovercheck
Attorney

United States Patent Office 3,232,807
Patented Feb. 1, 1966

3,232,807
PROCESS FOR MAKING A WINDOW
Clarence E. Butcher, 3028 Greengarden Blvd., Erie, Pa.,
and James A. Conley, R.D. 2, Meadville, Pa.
Filed Oct. 11, 1962, Ser. No. 229,795
1 Claim. (Cl. 156—212)

This invention relates to windows and, more particularly, to a transparent or translucent window which can be utilized either as a skylight or as a window disposed in a vertical plane.

Since there is no method of softening a thermosetting resin once it has set, it has been difficult to manufacture such articles. Windows which are subjected to changes in temperature and thermostresses resulting therefrom over long periods of time could not be satisfactorily glued together by any well known means when made of more than one sheet of material.

In the present invention, the several sheets of material are joined together over a sheet of identical material which has been cured while they are wet and uncured. Thus, the two sheets of material at the edges become integral and have an expansion like that of the cured sheet. Therefore, no moisture can get between the two sheets, flexing due to mechanical strains or thermostrains will not affect the sheets, and stress concentrations at the edges of the finished device are eliminated. The arched cured sheet forms a cavity therein during manufacture and, therefore, great structural strength results.

A window embodying the present invention is made of three layers of fiberglass impregnated resin. One layer is arched away from the other so that the window has sufficient strength and rigidity so that it can be mounted in a window opening either horizontally or vertically, without resorting to expensive frames and supports. Another important feature of the present invention is the simplicity of manufacture of the device which invloves providing a cured fiber glass sheet as the sole form necessary.

It is, accordingly, an object of the present invention to provide an improved window.

Another object of the invention is to provide an improved method of fabricating a window.

A further object of the invention is to provide a window which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

Figure 2:
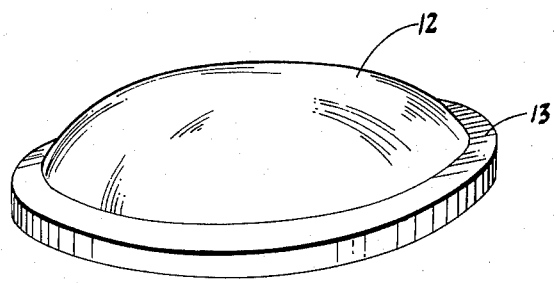
FIG. 2 is a perspective view of the window.
Figure 1:
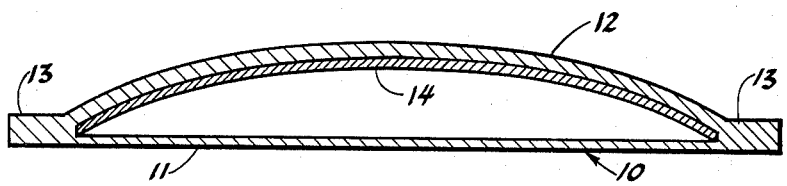
FIG. 1 is a cross sectional view of a window according to the invention.

Now with more particular reference to the drawing, a closure or window 10 is shown having a lower flat wet sheet 11 and an upper flat wet sheet 12 integrally formed together at 13. The upper convex sheet 12 is laid over an inner dry sheet 14. The upper sheet 12 and the lower sheet 11 are uncured. Thus, the edges 13 are completely integral with each other when cured.

The term "wet sheet" is used herein to identify an uncured sheet.

In carrying out the process, the following procedure is followed:

(1) A convex sheet of material, preferably of the same type as the finished window, is formed and laid in place at 14.

(2) A flat sheet 11 of thermosetting plastic reinforced with fiber glass is laminated on a flat smooth surface.

(3) The sheet 14 is laid over the sheet 11 concave side down as indicated.

(4) Polyester resin or epoxy resin is laid over top of the sheet 14.

(5) Bats of fiber glass material are laid over the polyester. Then additional fiber and resin desired are added.

(6) The window is cured by heating or mixing accelerator with the material as required according to the type of material used.

Any of the well known polyester resins or epoxy resins which are used in fiber glass and are well known to the trade may be used. Thus, a strong translucent window results which is unaffected by thermostresses.

The foregoing specification sets forth the invention in its preferred practical forms but it is understood that the structure shown is capable of modification within a range of equivalents without departing from the invention which is to be understood is broadly novel as is commensurate with the appended claim.

The embodiments of the invention in which an exclusive property or privilege is claimed are defined as follows:

The process of making a window comprising laying up a flat uncured sheet of fiber glass impregnated with a material taken from the group consisting of polyester and epoxy resin on a flat surface, laying a cured sheet formed with a concave surface on one side over said first mentioned sheet with the concave side facing the sheet, laying up a third sheet of the same uncured material as said first mentioned sheet over said second mentioned sheet with the edges of said first mentioned sheet and said third mentioned sheet merging to form a single integral peripheral edge, and then curing the said sheets.

References Cited by the Examiner

UNITED STATES PATENTS

| | | | |
|---|---|---|---|
| 2,011,468 | 8/1935 | Bronson | 161—44 |
| 2,870,793 | 1/1959 | Bailey. | |
| 2,977,637 | 4/1961 | Thompson | 264—250 |

FOREIGN PATENTS 879,927   10/1961   Great Britain.

EARL M. BERGERT, *Primary Examiner.*